United States Patent [19]

Mylne, III

[11] Patent Number: 4,943,917
[45] Date of Patent: Jul. 24, 1990

[54] IRRIGATION CONTROLLER HAVING MULTIPLE CANCEL MODES INVOKED BY DEPRESSING SINGLE KEY

[75] Inventor: John M. Mylne, III, Riverside, Calif.

[73] Assignee: The Toro Company, Riverside, Calif.

[21] Appl. No.: 350,450

[22] Filed: Jul. 10, 1989

Related U.S. Application Data

[60] Division of Ser. No. 237,658, Aug. 25, 1988, Pat. No. 4,852,051, which is a continuation of Ser. No. 888,621, Jul. 18, 1986, abandoned, which is a continuation of Ser. No. 581,030, Feb. 17, 1984, abandoned.

[51] Int. Cl.$^5$ .............................................. G06F 15/56
[52] U.S. Cl. ..................................... 364/420; 364/146
[58] Field of Search ........................ 364/420, 140-146, 364/147; 239/67-70

[56] References Cited

U.S. PATENT DOCUMENTS 4,165,532  8/1979  Kendall et al. ...................... 364/145
4,176,395  11/1979  Evelyn-Veeve et al. ............ 364/420

Primary Examiner—Allen MacDonald
Attorney, Agent, or Firm—Poms, Smith, Lande & Rose

[57] ABSTRACT

An irrigation controller having multiple cancel modes invoked by depression of a single key. When no watering is taking place, a single depression of the key will cancel all watering scheduled to take place on the day the key is depressed. Two successive depressions of the key when no watering is taking place will cancel all scheduled watering. A single depression of the key while watering is taking place will cancel just the watering which is taking place, not the watering scheduled to thereafter take place on that or any subsequent day.

3 Claims, 13 Drawing Sheets

Fig. 2F.

```
    TIME        DAY
  ┌─────────────────┐
  │ 0 1   45    0 2 │
  └─────────────────┘
   STA   RUN
         TIME
```
ACTIVE (ENTER), OR IN-ACTIVE CLEAR.

Fig. 2G.

```
    TIME        DAY
  ┌─────────────────┐
  │ 0 1   6    0 2 A│
  └─────────────────┘
   STA   RUN
         TIME
```
INDIVIDUAL STATION } ACTIVE
START TIME          } (ENTER)

Fig. 2H.

```
    TIME        DAY
  ┌─────────────────┐
  │ 0 1   6    - - A│
  └─────────────────┘
   STA   RUN
         TIME
```
INDIVIDUAL STATION } IN-ACTIVE
START TIME          } (CLEAR)

Fig. 2I.

```
    TIME        DAY
  ┌─────────────────┐
  │ 1 2 3 4 P    C  │
  └─────────────────┘
   STA   RUN
         TIME
```
DISPLAY WHEN "CANCEL" HAS BEEN ACTIVATED.

Fig. 2J.

```
    TIME        DAY
  ┌─────────────────┐
  │ 1 2 3 4 P   P C │
  └─────────────────┘
   STA   RUN
         TIME
```
DISPLAY WHEN "PERMANENT CANCEL" IS ACTIVED.

Fig. 2A.

TIME  DAY
| 1 2 3 4 P    0 5 |
STA   RUN TIME

DISPLAY IN NORMAL OPERATION.

Fig. 2B.

TIME  DAY
| 1 2 3 4 P        |
STA   RUN TIME

DISPLAY WHEN CLOCK IS BEING CHANGED.

Fig. 2C.

TIME  DAY
|       6    0 2 A |
STA   RUN TIME

DISPLAY WHEN $\overline{\text{START TIME}}$ (NO. 06) IS BEING ENTERED (02A).

Fig. 2D.

TIME  DAY
| 0 1    4 5       |
STA   RUN TIME

DISPLAY WHEN STATION (1) RUN TIME IS BEING ENTERED (45 MIN.) OR STATION IS ON.

Fig. 2E.

TIME  DAY
| 0 2    1 5 H     |
STA   RUN TIME

DISPLAY WHEN STATION (2) RUN TIME IS BEING ENTERED (15H) OR STATION IS ON.

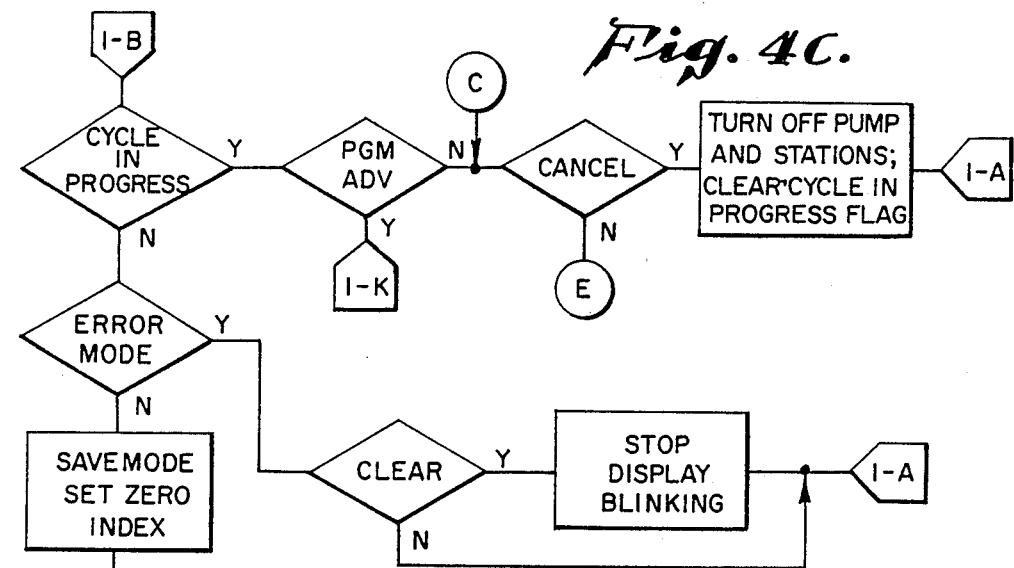
Fig. 4C.
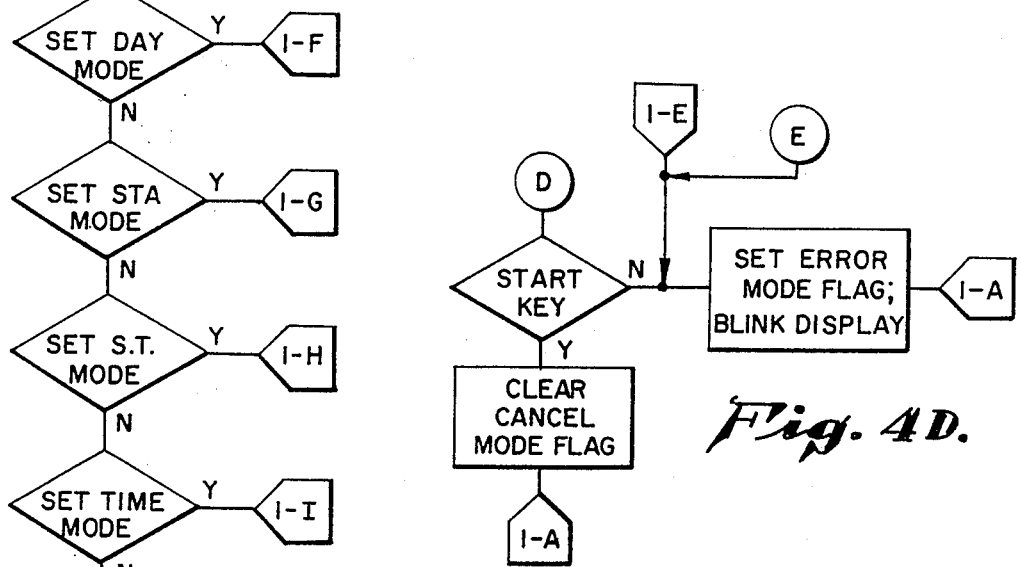
Fig. 4D.
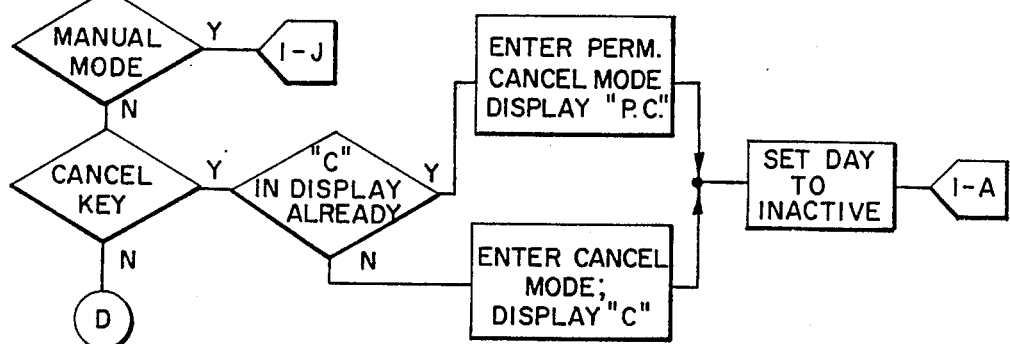

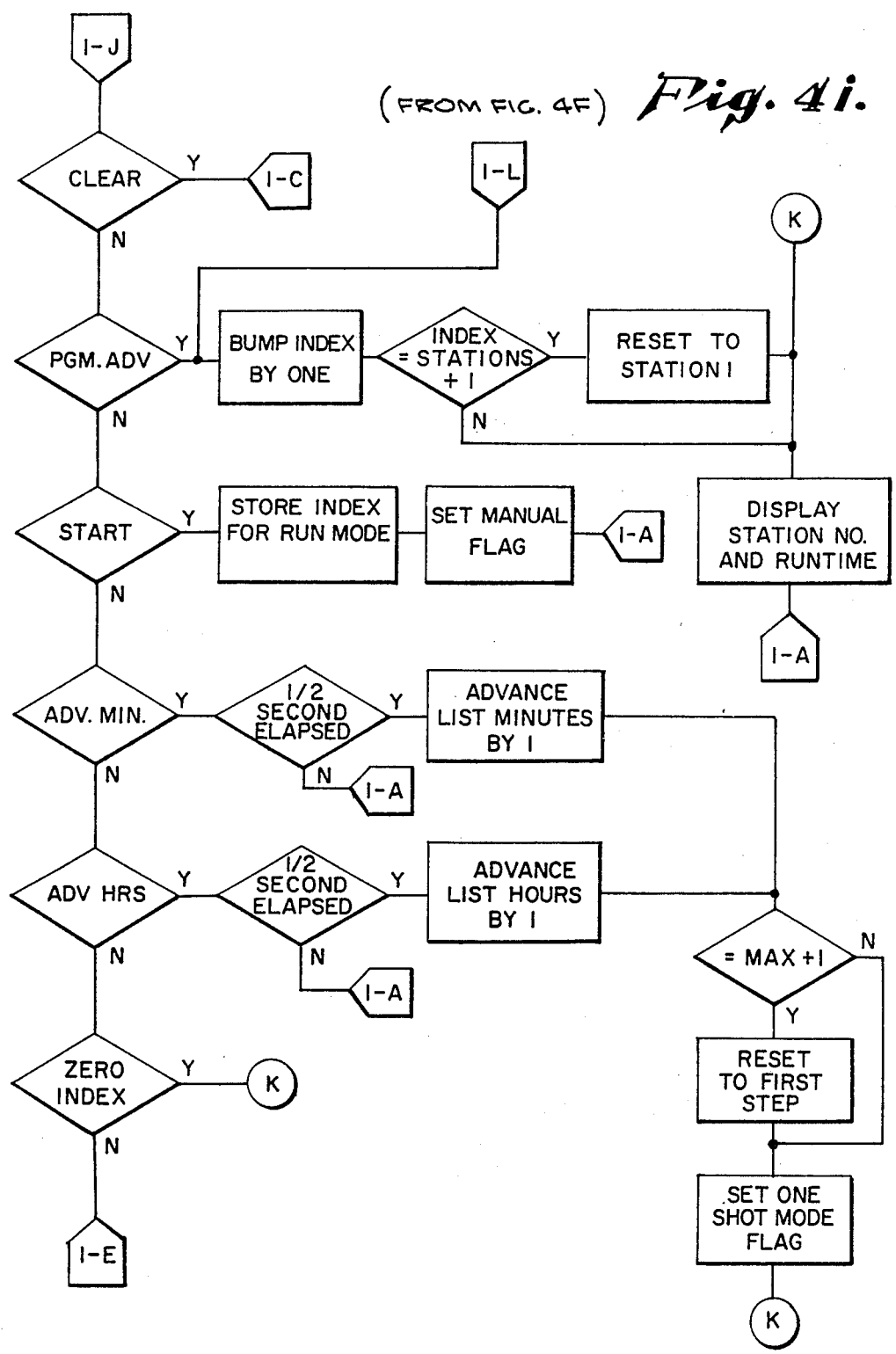
Fig. 4i. (FROM FIG. 4F)

IRRIGATION CONTROLLER HAVING MULTIPLE CANCEL MODES INVOKED BY DEPRESSING SINGLE KEY

This is a division of co-pending application Ser. No. 237,658 filed on 8/25/88, now U.S. Pat. No. 4,852,051 which was a file wrapper continuation of application Ser. No. 888,621 filed July 18, 1986, now abandoned; which was a continuation of application Ser. No. 581,030, filed Feb. 17, 1984, now abandoned.

BACKGROUND OF THE INVENTION

The present invention relates to controllers for irrigation systems, in general, and, more particularly, to irrigation system controllers employing solid state logic and control circuitry.

Reference is made to U.S. Pat. No. 4,165,532. entitled "Automatic Irrigation Sprinkler System Controller" by T. L. Kendall, et al. and to U.S. Pat. No. 4,189,776, entitled "Simplified Irrigation Controller, by T. L. Kendall, both of which patents are assigned to the common assignee of this application. In each of these patents there is described a solid state controller for the operation of irrigation systems. The solid state controller described in U.S. Pat. No. 4,165,532 is particularly adapted for large commercial irrigation systems such as those employed in parks, golf courses, and the like. Accordingly, the input keyboard and the logic sequences incorporated therein are adapted to provide the operator with a wide selection of features. Start times, run times, and the like are directly input as alphanumeric data through the keyboard which incorporates a plurality of keys for the input of such data.

The advantages attendant to such automated programmable solid state controllers are of equal benefit to the typical homeowner. The time normally devoted to the diligent watering of lawn and plant areas can be a major consideration to a homeowner. This is particularly true when the homeowner wishes to be gone for extended periods of time wherein arrangements must be made, with attendant cost, for someone to come in to perform the watering chores normally accomplished by the homeowner. While the benefits of an automatic controller for the home irrigation system are apparent, these benefits usually do not justify the expense of a complicatad professional controller such as described in the patent noted above.

In U.S. Pat. No. 4,189,776, there is described a simplified solid state irrigation controller particularly adapted for low cost availability to the non-professional user. This patent describes a simple step-by-step method for changing the start times, runtimes and active days for individual watering stations within the controller. Once this information has been selected and placed within the memory of the controller, however, the controller is not flexible enough to permit an individual watering station to be turned on for a single selected day within a fourteen-day cycle, for example.

SUMMARY

This invention is directed to a unique irrigation controller system which offers the user more flexibility over an individual watering station. The system is composed of solid state circuitry using the input panel of U.S. Pat. No. 4,189,776 and an improved logic arrangement to effect a more flexible and precise control over a large number of individual watering stations.

More particularly, the system permits a large number of watering stations to be selectively activated over an extremely wide range of times and durations. For example, an individual station can be activated on a rather frequent basis, six times a day, or on an infrequent basis, once every fourteen days. The system is adapted for several sequences, time schedules, or the like.

The system permits the operator to select the day, the start time or times, and the run time each individual station is activated. Once the system is activated, an automatic mode of operation can be followed wherein virtually any sequence of activated stations, days, and start times can be produced. Of course, manual control and/or override is also possible as is selective alteration or interruption of the system operation.

DESCRIPTION OF THE DRAWINGS

FIGS. 2A through 2J depict the configuration of the display portion of the input panel of FIG. 1 during various stages of the system operation.

FIGS. 4A through 4L collectively represent a flow chart depicting the operating sequences incorporated in the present invention wherein:

FIG. 4A is the initialization action routine;
FIG. 4B is a portion of the operation routine;
FIG. 4C is a further portion of the operation routine including keyboard routine;
FIG. 4D is the start key mode;
FIG. 4E is the set day routine;
FIG. 4F is the set station routine;
FIG. 4G is the set start time routine;
FIG. 4H is the fail safe loop;
FIG. 4I shows the manual operation loop;
FIG. 4J illustrates the zero index loop;
FIG. 4K is the individual active day mode; and
FIG. 4L depicts the start operation signal routine.

DESCRIPTION OF A PREFERRED EMBODIMENT

Figure 1:
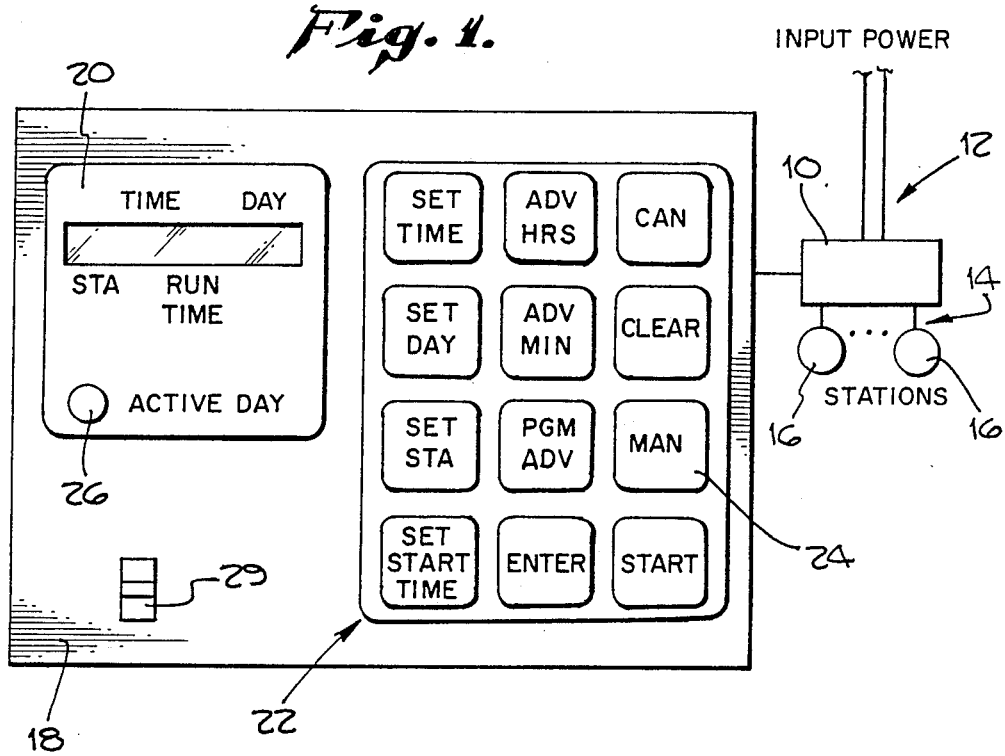
FIG. 1 is a representation of the simplified input panel associated with the controller of the instant invention.

Referring now to FIG. 1, there is shown a representative solid state irrigation controller 10 which comprises a power supply and logic circuit having power input lines 12 connected thereto and adapted for connection to an external source of power (e.g. 117 VAC) and a plurality of output leads 14 adapted for connection to one or more irrigation sprinkler stations 16. A detailed description of the operation of power supply and logic circuit 10 in conjunction with the operation of sprinkler stations 16 is contained in the aforementioned U.S. Pat. No. 4,165,532 to Kendall, et al. Some of the control signals and techniques described therein are advantageously incorporated in the instant invention. The improvement of the instant invention lies in the input/output controller 18 and the logic sequence associated therewith as described hereinafter. This improvement permits a flexible and individual control over a large number of watering stations.

In particular, the system apparatus and hardware in the instant invention comprises a 4, 6, 8, or 12 station, solid-state controller which is to be complementary to any existing electromechanical controllers. The unit is of solid state design and construction and is capable of operating two valves per station in conjunction with a pump circuit. In one embodiment the data and recall are accomplished via the keyboard 22 with visual readout by means of a light emitting display 20 as described hereinafter.

The system is designed to operate on 24 or 110 volts (nominal) and at 50 or 60 Hz. The station output is designed to be 24 volts AC (nominal) at 50 or 60 Hz, as is the master valve or pump output. The input power and frequency parameters are controlled by internal connections such as straps on PC boards, connector blocks or the like. The strap option permits the selection of 4, 6, 8 or 12 station operation, as well. Each of the stations has six independent, automatic start times per day. A 12 or 14 day programming capability is determined by another strap option included in the hardware of the system. The programmed operation of the system is then capable of factoring the 12 or 14 day option to select operable days every day, every second, third, fourth, sixth, or seventh day or every twelfth or fourteenth day. In addition, the system may be converted from a real time clocking arrangement, including a.m. and p.m., to a 24-hour operating cycle, by strap option. This permits the operator to adjust the clock to his time system. The system may also be programmed to operate each watering station for a fixed period of time after the event of a power failure using a strap to select an operating time of 0, 7, 12, or 25 minutes, for example. This permits a Fail-Safe watering cycle or sequence which has been customized by the operator in terms of the duration of the Fail-Safe watering operation. The time of zero minutes is important for drip watering systems of flower boxes which could be flooded after a power failure by a longer cycle. The seven minute time is long enough to permit a typical sprinkler to make at least two revolutions after a power failure.

As will be noted, the system is capable of a Cancel operation which terminates the current watering cycle and returns the unit to automatic operation. The system is further capable of a Cancel operation when in the automatic mode (with no watering in process) in which future start times on the instant day are cancelled or eliminated. A Permanent Cancel operation included to cancel the operation of the system for an extended duration and until manually restarted.

In describing the operation of the controller keyboard, various keys are shown. Each of these keys has a particular function. In particular, the SET TIME key is used to exit a fail safe watering condition, to establish a time setting mode, and to display the current day or date.

The SET DAY key is used to establish the day setting mode included in determining which day of the cycle is involved. This is also used to turn off stations which are to be inactivated that day.

The SET START TIME key is used to establish a start time program mode and to turn off the start time for that particular station.

The SET STA (Set Station) key is used to establish the station run time program mode wherein the running or watering time is established. In addition, the key is used as an entry point for individual station programming, active day, and active start time.

The PGM ADV (program Advance) key is used to step (i.e. advance) the system from one data entry point to another. For example, this key is used to advance from one station to the next station while programming station run times, sequence to next station in ordering sequence, and so forth.

The ADV HRS and ADV MIN keys are used to advance the hours and minutes, respectively, while setting the system and to advance automatically, while the key is depressed, at a rate of two hours per second or two minutes per second while setting the respective times during real time.

The CAN (Cancel) key is used to stop a watering cycle currently in progress, to cancel the remaining cycle starts for the day and/or to provide a Permanent Cancel operation by pressing the CAN key twice. (Incidentally, further activation of the CAN key will toggle from Cancel to Permanent Cancel).

The MAN (Manual) key is used to establish manual operation of the system.

The CLEAR key is used to clear any incorrect entry or information from memory on any individual program step. This key can also be used to inactivate a particular station or day as will be described.

The START key is used to return the system to normal automatic operation after an operational or input sequence, or to start a manual cycle, or to clear a Cancel (Permanent Cancel) input.

The ENTER key is used to enter data into memory while in the inputting mode, or to reactivate an individual day or start time. These twelve keys permit a greater range of program input than prior art systems due to the logic circuit to be described below.

Continuing the reference to FIG. 1, power supply and logic circuit 10 has an operator's panel 18 operably connected thereto. Operator's panel 18 contains a multi-purpose, alpha-numeric display 20, an operator's keyboard 22 having twelve switches 24, an "active day" indicator 26, and a switch 29 for manually turning off the controller outputs. In the preferred embodiment of the present invention, as built and tested by the assignee of the present invention, display 20 comprises an 8-digit panel. Each of the digits is formed by a 7-segment, LED display.

Power supply and logic circuit 10 includes memory and logic means for maintaining a current real-time clock value indicating the time of day as hours and minutes A(M) and P(M). That is, a day begins at 1200A and proceeds through 1159A; thence to 1200P through 1159P; and thence to 1200A to begin once again. This operation is not required in the 24-hour option, however. Further, either a 12-day or a 14-day watering sequence is maintained. That is, each time the real-time clock hour passes from 1159P to 1200A (corresponding to midnight), the memory location containing the day information is advanced by one. The day counter proceeds from 01 through 12 or 14 as determined by the strap option discussed above. When the logic sequence finds that the current day is to be advanced from 12 to 13, (or from 14 to 15) the current day is reset to 01. Each day of the watering sequence is indicated as being an "active" (i.e. watering) day by the active day indicator 26 being lit or an "inactive" (i.e. non-watering) day when the indicator 26 is not lit.

Six memory locations within circuit 10 are available for storing (i.e. listing) times of day at which a sprinkler output sequence can be initiated. As will be hereinafter developed in greater detail, the logic circuitry within circuit 10 continually compares the entries on this "start time" list to the current time of day. If the particular day is an "active" day and watering on that day has not been cancelled by the operator by techniques to be hereinafter described, each time a match is found between the current time of day and an entry on the "start time" list, an output sequence is initiated. During an output sequence, the appropriate sprinkler stations 16 are turned on in sequence for the individually preselected watering time, if they are "active" for the particular start time and day. That is, station 1, if active, is turned on for its time, then turned off and station 2, if active, 2 turned on for its watering time, and so forth. When the last station watering time has been completed, the logic sequence once again begins looking for a match between the current time and the "start time" list entries. It should be understood that, with the system described herein, any or all of the individual watering stations can be turned on or turned off when desired. That is, each individual station can be activated on a selected day or days, at a selected time or times, and for a selected length of time.

Referring now to FIGS. 2A through 2J, the operation of the display 20 in conjunction with the foregoing methods of operation is shown. In FIG. 2A, display 20 is shown in the "normal" operation configuration displaying the TIME and DAY. Thus, the left-most four digits indicate the time of day (1200–1159). The fifth position from the left indicates A or P (AM or PM). The seventh and eighth positions indicate the day of the watering sequence (01–14). In this operation, the sixth position is blank. It is to be understood that the specific data described herein in conjunction with the present invention is that incorporated in the tested embodiment thereof and is not meant to be exclusive. Thus, a 24-hour clock could be incorporated proceeding from 0001 through 2400 with the elimination of the AM and PM indicators. Likewise, a different number of days could be incorporated for the watering sequence.

For example, the display 20 has two digit positions dedicated to the cycle day which could be used for a 99-day watering sequence. However, the number of volatile memory locations available in the small microcomputers incorporated in such apparatus may be insufficient to allow the use of such large data quantities. Moreover, many residential users do not want such a far reaching control arrangement.

FIG. 2B shows the display 20 during the setting or changing of the time of day (e.g., setting the real-time clock). Again, the left four digits indicate the time of day (1200–1159) and the fifth position from the left indicates A or P as previously described with relation to FIG. 2A. The sixth position is blank while the seventh and eighth positions ("the day section") are also blank. As will be seen hereinafter, this is important since all other functions are locked out while programming (re-parameterization of watering data in the system) takes place. Other programming operations are readily apparent from the display as will be apparent from the description of FIG. 2C.

FIG. 2C shows the display 20 when a particular start time number is being entered for a particular time of day. In particular, the start time for a particular valve (in this case start time number 6) is entered for 02A (which is equivalent to 2:00 A.M.). This entry is provided after a station has been selected and the particular start time is chosen. That is, as indicated above and described subsequently, each station has up to six start times during any particular day. In this case, the sixth start time (i.e. start time number 6) is selected to be at 2:00 in the morning. The start time is indicated in the fourth digit position while the times are listed in the sixth, seventh, and eighth bit positions.

FIG. 2D shows display 20 when a particular station (in this case station 01) is either running or having the run time entered. The run time (in this case 45 minutes) is displayed when entered and when the station is operating.

FIG. 2E shows display 20 when a particular station (in this case 02) is either running or having the run time entered therein. However, in this case, the run time is 15 hours. This hour watering status is indicated by including the symbol H in the sixth display position.

FIG. 2F shows the display when an individual station (station 01) is being set for a particular day (day 02). In order to render this station active, it is usually not required to activate the keyboard 22. However, in order to render station 1 inactive (i.e. non-watering) on day 2, it is usually necessary to press the Clear key in keyboard 22. This action serves to turn out the active day light 26 (see FIG. 1) when this day and station are later accessed, by the system. Similarly, it may be re-activated by pressing the Enter key. (The run time indicated in positions four and five is of significance only when an active day is entered.)

FIG. 2G shows the display 20 when an individual station (01) has an active start time (06) which is being set active at a pre-established start time (02A). As will be discussed, this information is supplied by activation of the Enter key at keyboard 22 for an active start time for the station.

FIG. 2H depicts the display 20 when an individual station start time is cleared so that the start time is rendered inactive for this station. In this case, station 01, start time 6 is cleared (i.e. replaced by dashes) of a time (such as time 2 A.M. shown in FIG. 2G). The A or P will remain until the station and start time are later activated re-entered with a new start time established.

FIG. 2I shows display 20 when a "Cancel" operation has been activated by the operation of the CAN key on the keyboard 22. The display 20 shows the time of day the CAN key was operated and, also, displays the character "C" to show that the Cancel operation has been ordered.

FIG. 2J depicts the display 20 when a Permanent Cancel function has been activated. The actual or real time is displayed, in this case 12:34 P.M., but the characters P and C are displayed. A Permanent Cancel operation is achieved by operating the CAN key twice in succession. A Permanent Cancel is used when it is desired to suspend the automatic watering sequence for an extended time duration.

Figure 3:
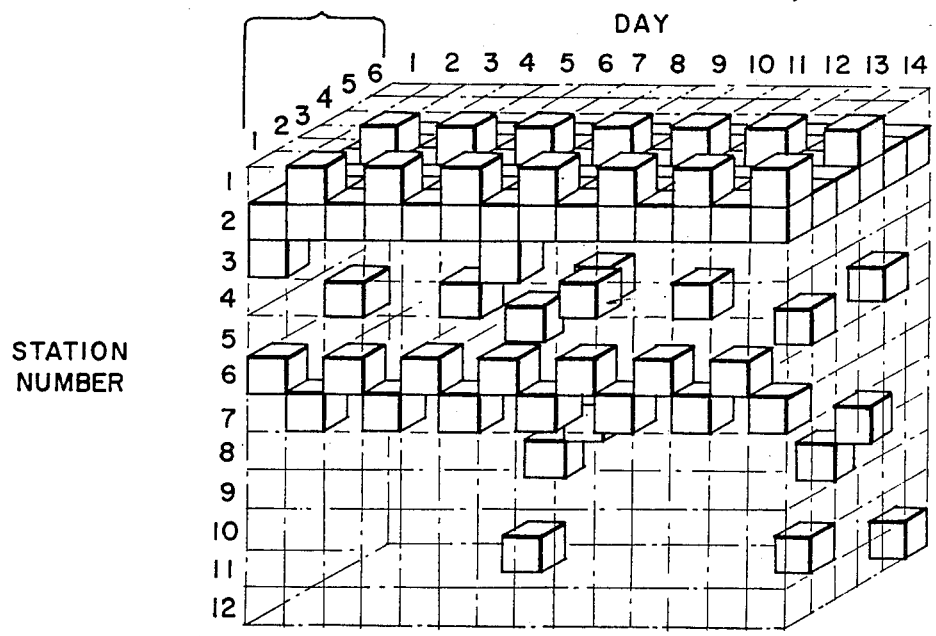
FIG. 3 is a dimensional, graphic representation of the flexible system operation permitted by the controller of the instant invention.

Referring now to FIG. 3, there is shown a three dimensional graphic representation (matrix) of the operation of the integrated solid-state controller of the instant invention. In particular, the chart indicates the operation up to 12 stations (station number) for up to 14 days (day) with up to 6 start times (start time no.) per station per day. As shown in the chart on FIG. 3, a particular station, for example, station number 2 can be rendered operative each day of the operating cycle of the controller, for example, 14 days. In addition, this station can be rendered operative for up to 6 start times each day of the cycle. In this particular example, if the run time is set to be 30 minutes for 6 consecutive start times, station number 2 would be operative a total of three hours for any active day, therefore, a run time of approximately 30 minutes (more or less) on station number 2 can be turned on 6 times a day for 14 days wherein heavy watering can take place. In similar fashion, station number 1 can be turned on twice, start times 1 and 4, on every other day, in this example the even numbered days.

At the other extreme of the controller operation, station number 12 is turned on only at start time number 6 on day number 14 of the operating cycle. Thus, a single start time for any particular station during a 14 day cycle can be achieved as well as a multiple start time on multiple days during the cycle.

Of course, any particular station can be rendered totally inactive for all of the start times of the entire cycle. However, this is a condition which would not be used very often. Nevertheless, it can be seen from the chart representation in FIG. 3 that a great flexibility and variability in control of operation can be achieved with the controller of the instant invention. This flexibility was not present in prior art irrigation controllers such as that shown in U.S. Pat. No. 4,189,776.

Referring now to FIGS. 4A through 4L collectively, there is shown a flow chart which describes the operation of the irrigation controller of the instant invention. For convenience, the operation is broken down into various routines and subroutines which define the operation of the device and portions thereof.

Figure 4A:
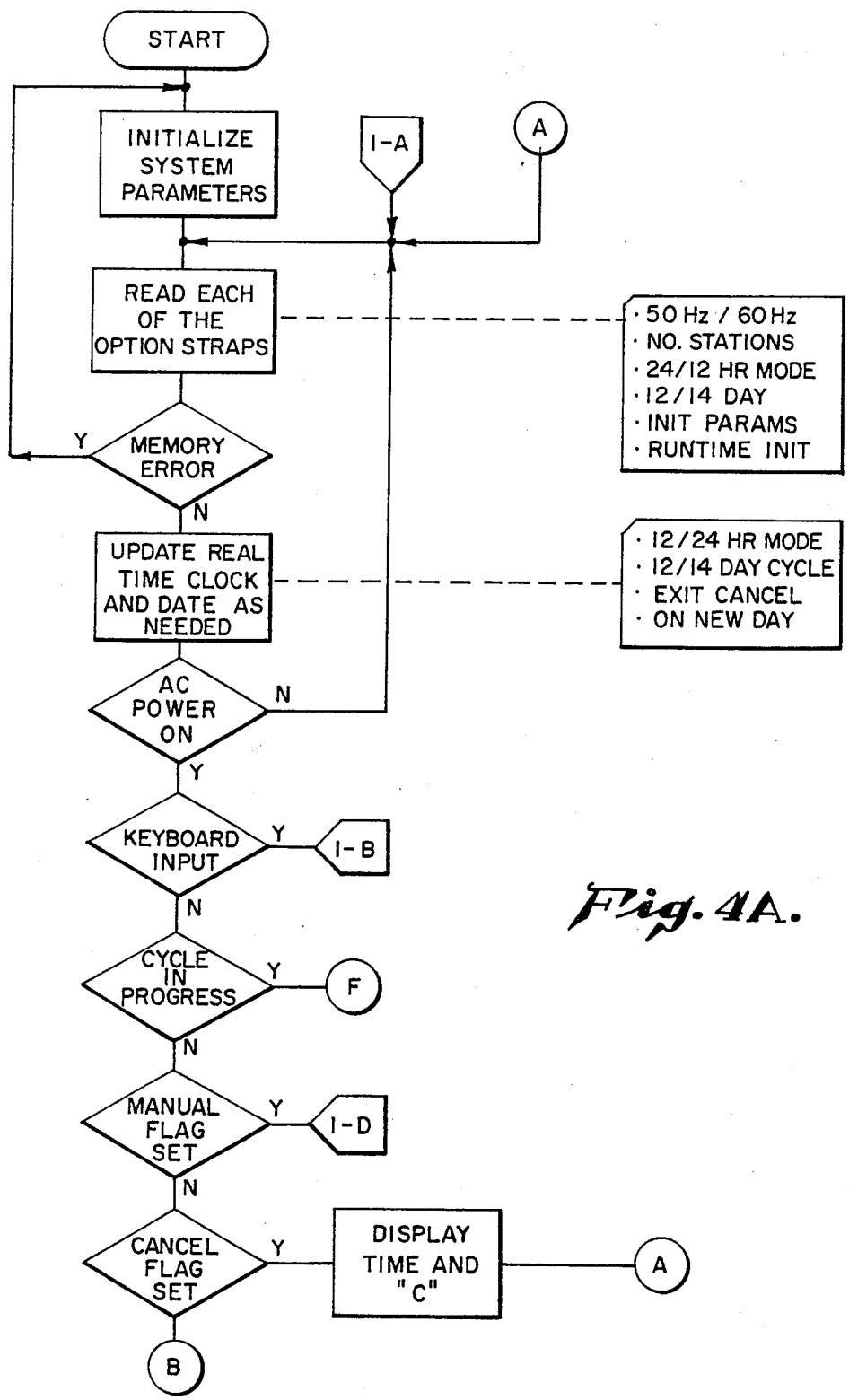

Referring in particular to FIG. 4A, there is shown the initialization action routine of the controller. In particular, when the operation starts as, for example, by operation of a start button, the system immediately begins to initialize all of the system parameters such as setting certain values to zero or the like. This includes a reading of each of the option straps noted above. That is, the circuit determines whether the 50 Hz or 60 Hz operation has been selected. Also, the number of stations, the 24/12 hour mode, the 12/14 day mode. Other parameters are controlled in a similar fashion. The initialization parameters (INIT PARAMS) and the runtime initialization (RUNTIME INIT) are all read and included into the initialization operation. The information relative to these various options is stored in the appropriate memory location. With this operation, the system then checks for memory error by comparing the memory location to the strap configuration and updating as required. If there is a memory error, the system returns to the initialization stage and performs this operation again.

If there is no memory error, the system is operative to update the real time clock and the date as needed. This update is typically produced on the 12/24 hour mode, the 12/14 day cycle, the exit cancel, on a new day and so forth. The updating of the real time clock and date is, typically, performed under operator control.

The system then checks to see if the AC power is on or not. The prior operations can be performed under battery powered operation. If the AC power is not on, the system recycles, under the battery power, to again read each of the option straps. The battery power keeps track of real time and retains the function of the system before failure in the memory, that is, watering or not watering, etc. This operation is extremely important and advantageous in that prior art devices frequently omitted to do this operation wherein false information could be stored in the system after a power outage or interruption or the like. If the AC power is not on, all output and display circuits are disabled in order to preserve power.

Once the AC power is restored, after a power failure or interruption, the system continues to recycle and check for an error. If an error is found, the system is set to 12:00 p.m. Thereafter, the system is clocked until 12:00 a.m., at which time a fail-safe watering sequence is initiated. That is, a 0, 7, 12, or 25 minute long watering time is automatically programmed to each watering station per day depending on where the runtime initiation strap is placed within the controller.

If no error is found, this indicates that the alternate power source or battery kept the system clock at the correct time and retained a memory of any ongoing function prior to failure. In this mode, the system returns to the previous function. For example, if a sprinkler station was in the process of watering, that station's cycle would be completed along with the remaining stations in the sequence. Thereafter, the real time clock is updated by adding the time the controller was without AC power. In this manner all watering cycles for subsequent days after power failure are uneffected.

If the AC power has been on without failure or interruption, then a keyboard input is detected. As part of the keyboard input detection operation, a keyboard security check is also made. This check is utilized to determine whether or not any erroneous keyboard entries have been made, for example, a multiplicity of entries or keyboard bounce or the like. If a keyboard input is not detected, the system checks to see if there is a cycle in progress. If not, the system checks to determine if a manual flag signal has been set. Again, if not the system checks to see if the flag set has been cancelled. If not, the system then goes to the operation cycle shown in FIG. 4B as described hereinafter.

On the other hand, if the keyboard input is present when checked, the system operation switches to the cycle shown in FIG. 4C. In similar fashion, if a cycle in progress is detected, the system switches to the operating cycle shown in FIG. 4B.

Figure 4B:
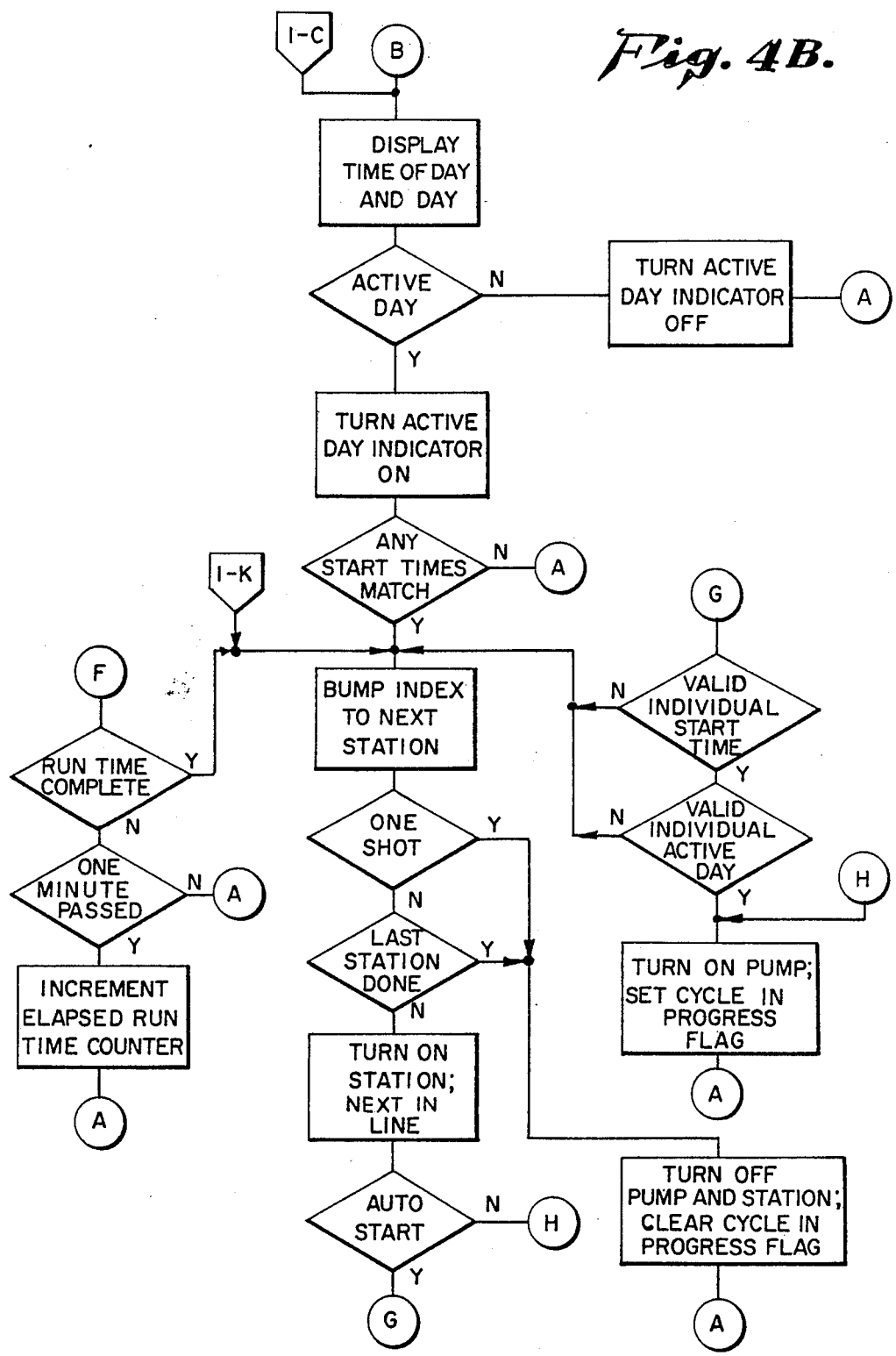

In similar fashion, if the manual flag signal has been set the circuit operation switches to the cycle shown in FIG. 4B.

Also, if the Cancelled Flag Set signal is detected, the system is instructed to display the time and the cancel designator, i.e. "C" and to repeat the cycle shown in this figure by returning to the read step wherein each of the option straps is read (see the circled A input step). If the Cancel Flag Set signal is not detected, the system then is instructed to proceed to the operating routine which is set forth in FIG. 4D.

Referring to FIG. 4B the station evaluation of a portion of the operation is shown. This portion of the operation continues from the operation described in FIG. 4A. In particular, if the cancelled flag set has not occurred, a signal is supplied from the logic circuit portion indicated in FIG. 4A to cause the display to show the time of day and the day in the cycle of the system. The system then evaluates the day indication to determine if this is an active day, i.e. a day in which the system is operative to produce watering. If it is not an active day, the system is instructed to turn off the active day indicator and to return to the operation cycle relative to FIG. 4A.

Conversely, if the day is an active day, the system is instructed to turn on the active day indicator and to determine whether any start times match with the time of day which is displayed. If there are no matches between the indicated time and the start times, the system is instructed to return to the operation shown in FIG. 4A. If there is a match between any of the start times and the time indicated in the display, the system is instructed to "bump" the index to the next station so that the next station is stored in the system for future operation along the lines previously described.

When the index has been bumped to the next station, a one shot watering cycle is initiated. If a one shot (or one time) cycle has been triggered, the system is instructed to turn off the pump and station and, as well, to clear the "cycle in progress flag" from the logic circuitry and then to return to the operating cycle as shown in FIG. 4A.

Conversely, if a one shot watering cycle had not occurred, the system is directed to determine whether the last station in the system is finished its operation. If the last station has completed, the system is again instructed to turn off the pump and station, to clear the cycle in progress flag and to return to the initial operation as indicated in FIG. 4A.

On the other hand, if the last station is not done, the system is instructed to turn on the station which is next in line, and to initiate the automatic start for the cyclic operation of the circuit.

Also, shown in FIG. 4B is the current operation of the system wherein the operation in FIG. 4A is also controlling. That is, if the "cycle in progress" interrogation was positive, FIG. 4A, the system is instructed to determine if the run time is complete. If the run time is complete, the system is instructed to bump the index to the next station and to proceed with that portion of the operation as previously noted.

Conversely, if the run time has not been completed, the system performs an interrogation wherein it is determined whether one minute has passed. If the minute has not passed, and the run time is not complete, the system is instructed to return to the cyclic operation shown in FIG. 4A. On the other hand, if one minute has passed, the system is instructed to increment the elapsed run time counter by one and to then return to the system operation format as shown in FIG. 4A.

Also, referring to FIG. 4B, once the auto start decision has been made, the system is instructed to determine if a valid individual start time is present. If not, the system then bumps the index to the next station and proceeds along the operating cycle shown.

On the other hand, if a valid individual start time is provided, it is determined whether a valid individual active day is currently provided. If not, the system is once again instructed to bump the index to the next station and proceed along those lines. If the valid individual active day is detected, the system is instructed to turn on the pump, set the cycle in progress flag and then return to the initialization operation shown and described in FIG. 4A.

If the auto start is not detected, the system is instructed to turn on the pump, set the cycle in progress flag and return to the initialization process of FIG. 4A as if a manual operation is in progress.

The reader should understand that the signals provided by the valid individual start time and valid individual active day means are important in establishing a flexible controller which is capable of controlling each individual watering station. The matching of the valid individual start time and valid individual active day with the real time clock at the start times match mode requires but a simple yes or no. This reduces the amount of information stored within the memory of the controller system as it requires but one bit of memory.

Referring now to FIG. 4C, there is shown a further portion of the operation of the circuit of the instant invention. In this instance, the circuit operation is initiated from the circuit of the operation shown in FIG. 4A if and when a keyboard input has been detected in the initialization operation. If the keyboard input is detected, the system then determines whether a program advance has been selected at the keyboard. If the answer is yes, the circuit operation is as described in FIG. 4B. If the program advance is not selected, the system determines whether a Cancel signal has been applied to the circuit operation. If the Cancel signal has been supplied, the system is instructed to turn off the pump and stations, clear the cycle in progress flag and return to the initialization operation shown in FIG. 4A. This is usually a situation wherein the operator of the system has manually inserted a cancel signal.

If the cancel signal is not detected, the circuit operation follows as is described in FIG. 4D.

Continuing with the operation as depicted in FIG. 4C, if the cycle in progress is not detected, the system immediately checks to see if an error has been detected and the system is operating in the "error mode". If the error mode is detected, the system makes the decision as to whether a clear signal has been selected by the operator. If the clear has been selected, the system is instructed to stop the display from blinking and to proceed to the initialization circuit operation as shown in FIG. 4A. Conversely, if the clear signal has not been selected, the system is directed to immediately to return to the initialization procedure of FIG. 4A and the display continues to blink.

Returning to the error mode detection, if the error mode is not detected, the system is instructed to operate in the save mode and to set the zero index signal immediately. After this, the system determines whether the set day mode has been selected. If it has, the circuit is instructed to go to the keyboarding operation cycle shows and described relative to FIG. 4E. In the event that the set day mode is not operative, the system then checks to see if the set station mode is operative. In the event that the system is in the set station mode, the system operates as shown and described in FIG. 4F.

If the system is not in the set station mode, it is then checked for the set start time mode. If the system is in this mode of operation, the sequence shown and described relative to FIG. 4G is followed.

In the event that the start time mode is not pertinent, the system checks the set time mode. If the system is in the set time mode, the system follows the operating routine shown and described in FIG. 4H.

If the system is not in the set time mode of operation, the system then checks to see if the system is in the manual mode of operation. If this is the case, the system then follows the operation which is shown and described in FIG. 4I. If the system is not in the manual mode, the system checks to see if the Cancel key has been depressed. If the Cancel key has been depressed by the operator, the system checks to see if a "C" is already displayed. If the answer is yes, the system is then instructed to enter a Permanent Cancel mode and to place a "PC" in the display. The system then is instructed to set the day in question to inactive and to return to the initialization operation shown in FIG. 4A.

If the "C" is not already in the display, the system is instructed to enter in the cancel mode and to display a "C" at the display unit. The system then proceeds to set the day to inactive and returns to the initialization routine shown in FIG. 4A.

In the event that the system does not detect a Cancel key operation, the system is instructed to determine whether a start key has been operated (see FIG. 4D). If the start key has been operated, the system is instructed to clear the cancel mode flag and return to the initialization routine shown and described in FIG. 4A. In the event that the start key has not been activated (a non valid key depressed elsewhere), the system is instructed to set the error mode flag and to cause the display to blink and then return to the initialization operation routine as shown in FIG. 4A.

Figure 4E:
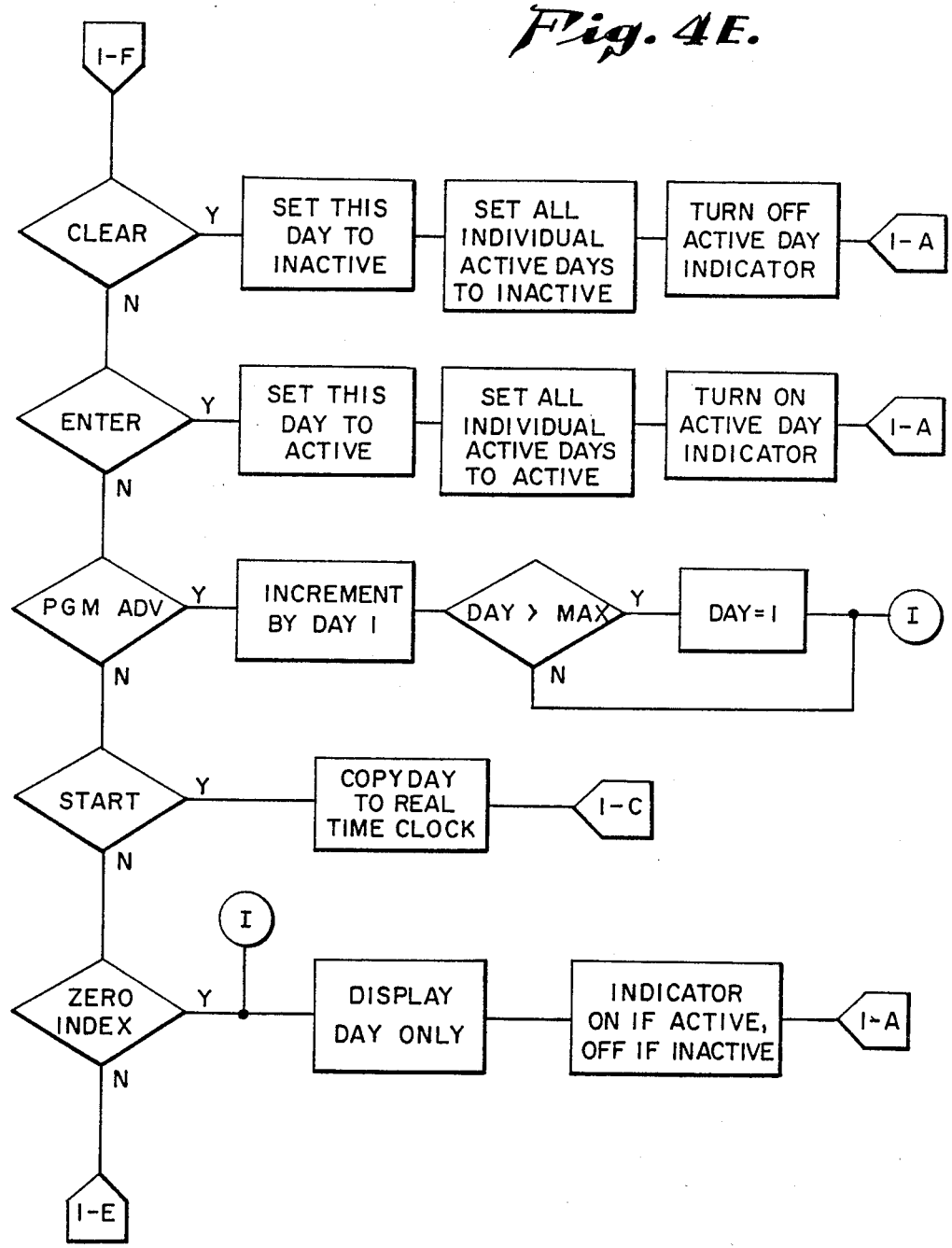

Referring now to FIG. 4E, there is shown the circuit operation of the Set Day routine which is initially triggered if the set day mode has been detected in the proceding mode of operation. This mode of operation, which is indicative of setting the active days of operation of the system.

In this mode of operation, the system first checks to see if a clear signal has been given by the operator at the keyboard. If the clear signal has been presented, the system is instructed to set this day, i.e. the day which is currently displayed to inactive. The circuit also sets all individual active days to the inactive status and also turns off the active day indicator and returns, turns to the initialization routine shown in FIG. 4A. This indicates that the system has been cleared by the operator and any prior information is overridden.

If the clear signal has not been detected, the system determines whether an enter signal has been provided by the keyboard operator. If such an enter signal has been provided, the system is instructed to set the current day to active, and to set all individual active days to active, to turn on the active day indicator and then return to the initialization operation routine shown in FIG. 4A.

If an enter signal has not been provided, the system checks to see if the program advance has been entered by the operator. If the answer is yes, the system is instructed to increment the day number and to check to see if the day number is greater than the maximum permitted (i.e. 12 or 14 days). If the maximum has been exceeded, the system is instructed to set the day equal to one and then to jump to the display routine which will be described hereinafter. Conversely, if the day is not greater than the maximum, the system immediately jumps to the display routine noted and described above.

In the event that a program advance signal has not been entered by keyboard operation, the system is instructed to check to see if a Start signal has been entered. If a start signal has been supplied, the system is then instructed to copy the day (i.e. the number of the day in the cycle) into the real-time clock operation. When this is accomplished, the system immediately jumps to the display operation shown in FIG. 4B.

Conversely, if the Start signal has not been entered the system is instructed to see if the zero index has been detected. If it has, the system is instructed to display only the day number. The system is then instructed to turn on the indicator if the day in question is an active day and to turn off the indicator if the day in question is an inactive day. The system is then instructed to return to the initialization loop shown and described in FIG. 4A.

If the zero index has not been activated, the system is instructed to return to the loop shown in FIG. 4D and to set the error mode flag, blink the display and then return to the initialization loop of FIG. 4A.

Figure 4F:
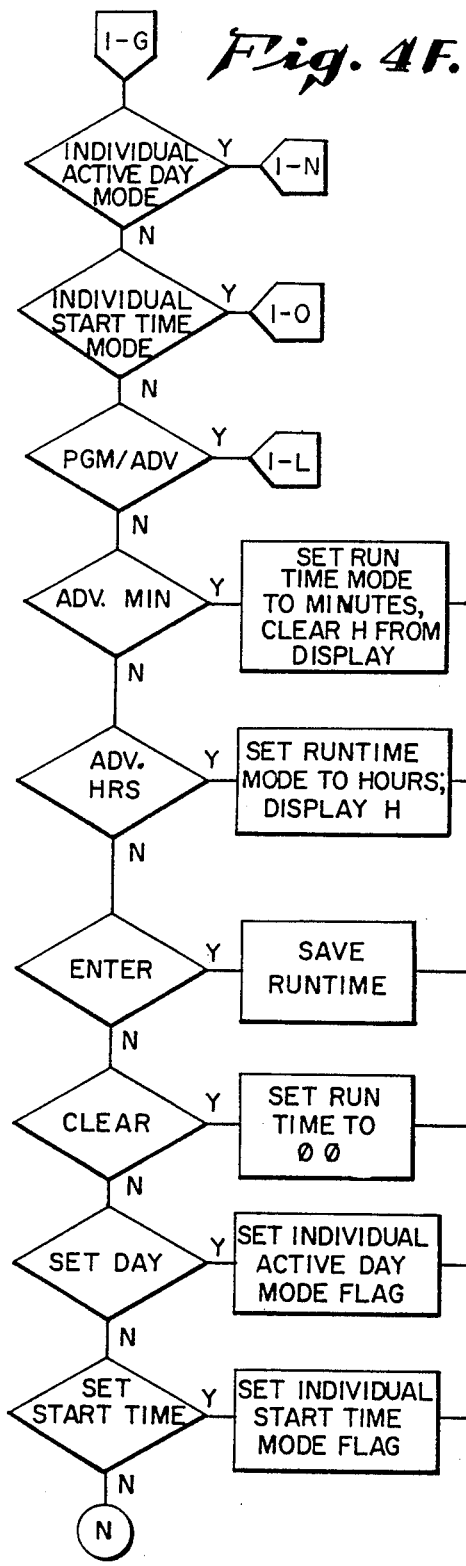
Figure 4J:
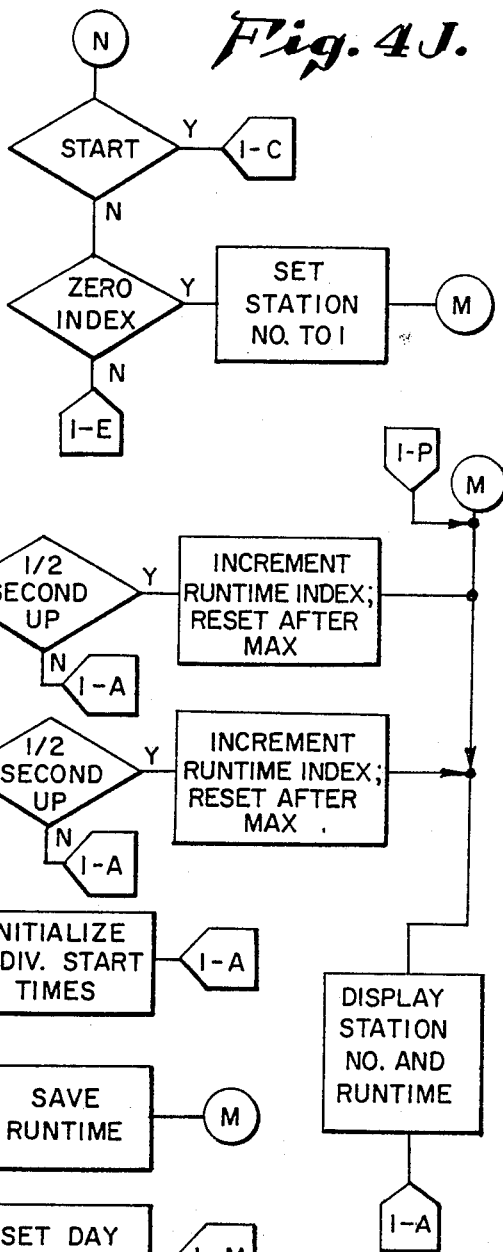
Figure 4G:
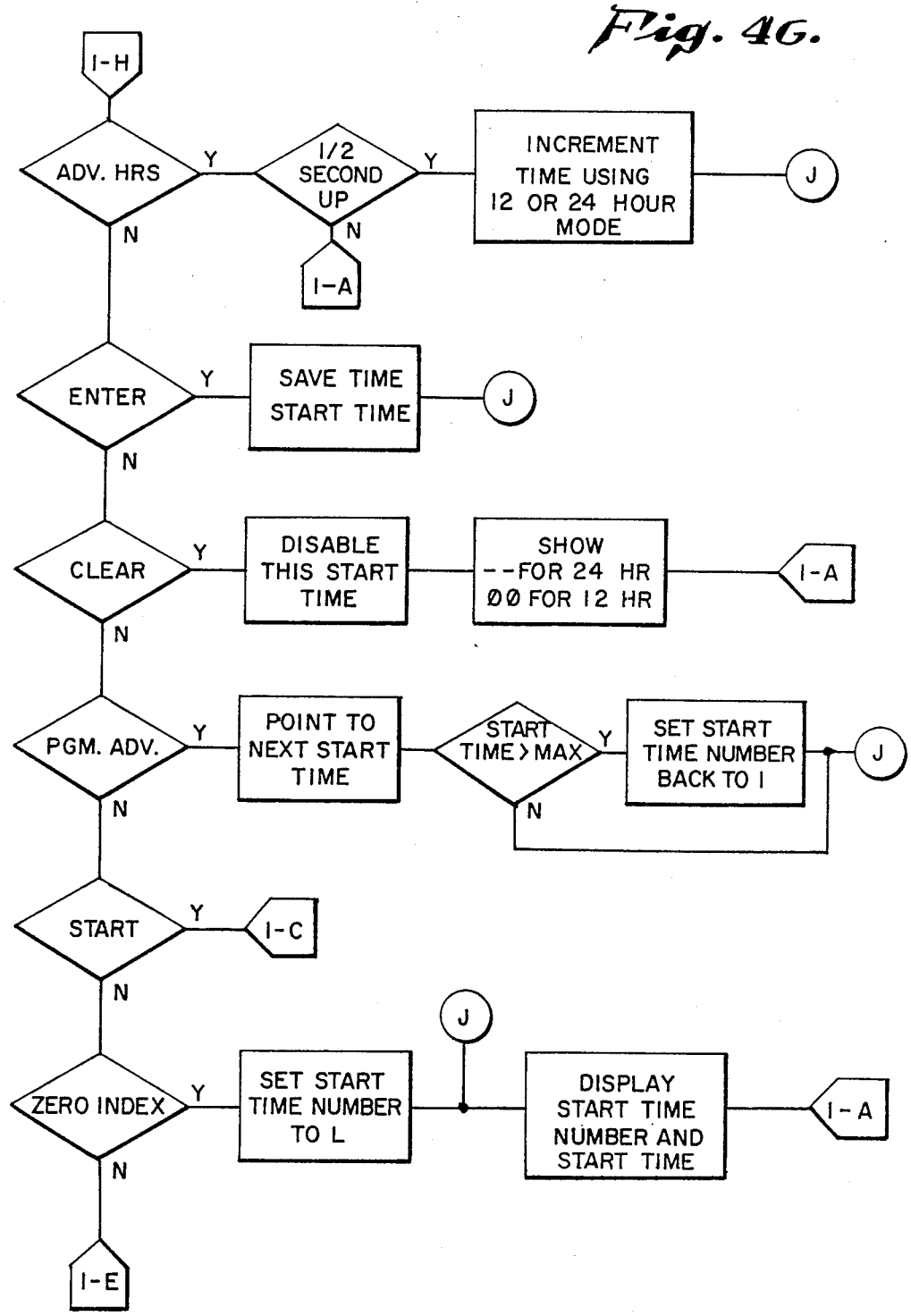

Referring now to FIG. 4F, there is shown the operating loop for performing the set station routine. This operation loop is initiated when the set station mode test (see FIG. 4C) indicates a positive response. Thus, when this positive response is detected, the system then determines whether the individual active day mode is in operation. If the answer is yes, the system is instructed to go to the program advance mode which is shown in FIG. 4K described hereinafter.

If the individual active day mode is not active, the system determines whether the apparatus is in the individual start time mode. If the answer is yes, the system is instructed to go to the start operation shown in FIG. 4L.

If the individual start time mode is negative, the system is instructed to determine if the program advance operation has been initiated. If the answer is yes, the system then switches to the operation shown in FIG. 4I.

If the Program Advance signal has not been generated, the system is instructed to check to see if the advance minutes signal has been set. If it has, the system is instructed to set the run time mode to the minutes and clear the hours (H) from the display. The system then determines whether a time interval of ½ second has expired. If the answer is no, the system is instructed to return to the initialization circuit shown in FIG. 4A. If the ½ second has expired, the system is instructed to increment the run time index and to reset after the maximum signal has been reached. Thereafter, the system is instructed to display the station number and run time and to return to the initialization loop shown in FIG. 4A.

If the Advance Minutes signal was not set, the system determines whether the advance hours signal is provided. If it has been, the system is instructed to set the run time mode to hours and to display an H at the display area. The system is then instructed to determine if the ½ second time has run (as was the case in the preceding description). If the ½ second is not up, the system is instructed to return to the initialization loop shown in FIG. 4A. If the ½ second time is up, the system is instructed to increment the run time index and to reset when it has reached the maximum. Thereafter, the system is instructed to display the station number and the run time and return to the initialization loop in FIG. 4A.

If the Advance Hours signal has not been provided, the system is instructed to determine if the enter signal has been supplied. If the enter signal has not been supplied, the system is instructed to save or retain the run time and then to initialize the individual start times and return to the initialization loop of FIG. 4A.

If the Enter signal has not been supplied, the system determines if the clear signal has been supplied. If it has, the system is instructed to set the run time to zero and to retain the run time and to display the station number and run time and return to the initialization loop in FIG. 4A.

If the Clear signal has not been supplied, the system is instructed to check to see if the set day signal has been supplied. If it has, the system is instructed to set the individual active day mode flag, to set the day to zero and then to transfer to the individual active day routine shown in FIG. 4K.

Alternatively, if the set day signal has not been provided, the system checks to see if the set start time signal has been provided. If it has, the system is instructed to set the individual start time mode flag and to set the start time index to 2 and then to switch to the loop operation shown in FIG. 4L. If the set start time is not provided, the system is instructed to see if the start signal has been provided (see FIG. 4J). If it has, the system is instructed to switch to the zero index loop shown in FIG. 4J.

If the Start signal has not been supplied, the system is instructed to check the zero index. If the zero index has been activated, the system is instructed to set the station number to 1, to display the station number and run time and return to the initialization loop shown in FIG. 4A. If the zero index signal is not shown (see FIG. 4D), the system is instructed to set the error mode flag, blink the display and return to the initialization loop in FIG. 4A.

Referring now to FIG. 4G, there is shown the Set Start Time routine which is activated when the system has detected that a Set Start Time mode signal is generated as shown in FIG. 4C. In the loop shown in FIG. 4G, the system is instructed to see if the advance hours signal is set. If it has been set, the system checks to see if the ½ second time period has elapsed. If not, the system is instructed to return to the initialization system shown in FIG. 4A. If the ½ second time has expired, the system is instructed to increment the start time using either the 12 or a 24 hour mode as was determined during the initialization step and by the strap signals and the like. The system is then instructed to display the start time number and the start time and return to the initialization loop shown in FIG. 4A.

If the Advance Hours signal is not detected, the system is instructed to evaluate the enter signal status. If an enter signal has been supplied, the system is instructed to save the start time, display the start time number and to return to the initialization loop shown in FIG. 4A.

If the Enter signal has not been supplied, the system is instructed to check the clear signal status. If the clear signal is provided, the system is instructed to disable the start time, show two dashes for a 24-hour mode or two zeros for a 12-hour mode and return to the initialization loop shown in FIG. 4A.

If the Clear signal has not been detected, the system checks the status of the Program Advance signal. If the Program Advance signal is provided, the system is instructed to point to the next start time and to determine whether the start time is greater than the maximum or not. If it is not, the signal immediately displays the start time number and the start time and returns to the initialization loop. If the start time is greater than the maximum, the system is instructed to set the start time number back to 1 and then to display the start time number and start time and return to the initialization loop.

If the Program Advance signal has not been generated, the system is instructed to evaluate the start signal status. If the start signal has been provided, the system returns to the display loop shown in FIG. 4B. If the start signal has not been provided, the system checks the zero index status. If the zero index has been reached, the system is instructed to set the start time number to 1, display the start time number and the start time and return to the initialization circuit shown in FIG. 4A. If the zero index has not been supplied, the system is instructed to set the error mode flag, blink the display and return to the initialization loop shown in FIG. 4A.

Figure 4H:
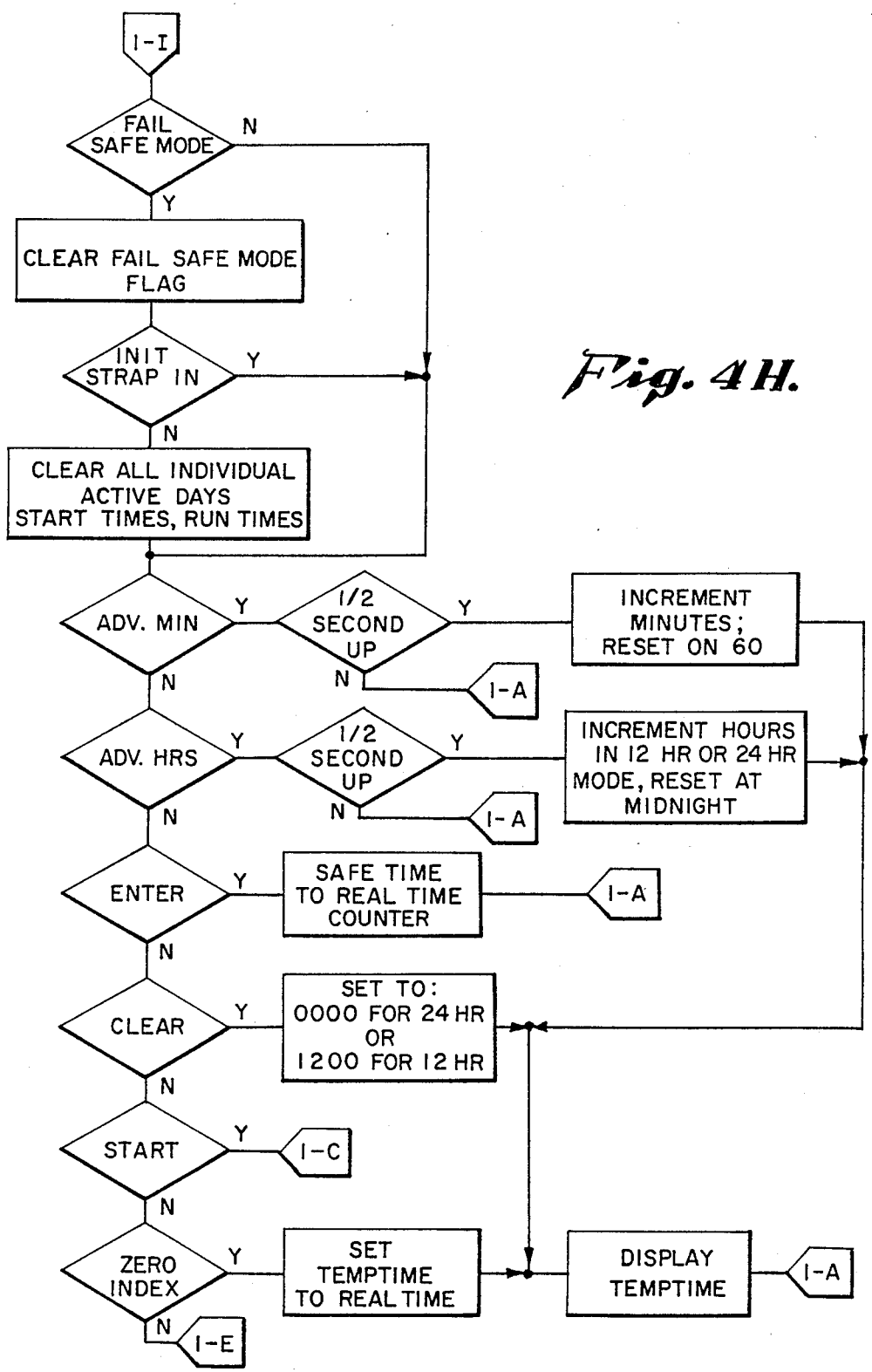
Figure 4K:
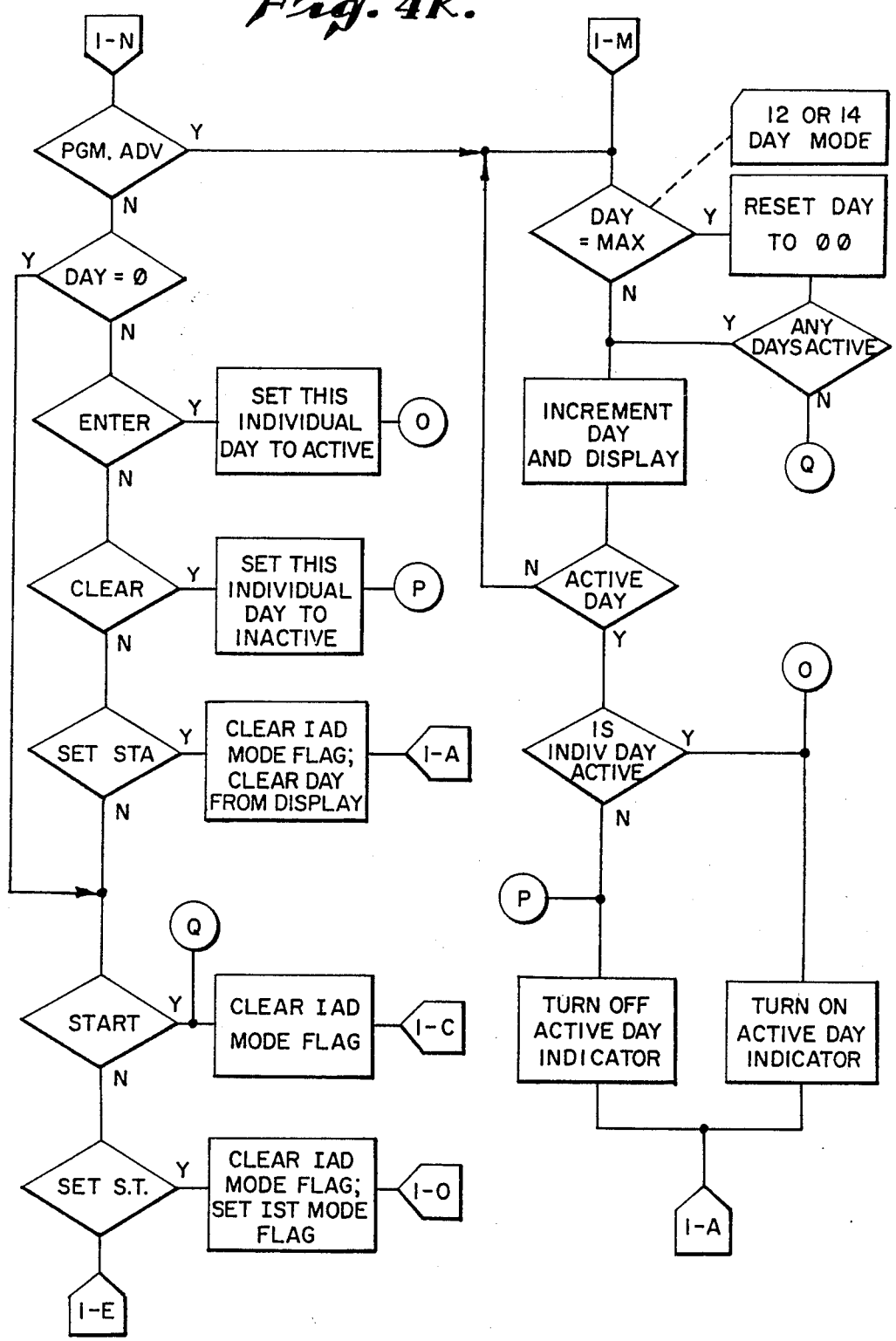

Referring now to FIG. 4H, the fail-safe loop is shown. This is the loop to which the system goes if the Set Time mode is activated as shown in FIG. 4C. The system immediately detects if it is operating in the fail-safe mode or not. If not, the apparatus switches immediately to a subsequent step in this loop as will become apparent subsequently.

If the fail-safe mode is operative, the system is instructed to clear the fail-safe mode flag and then determine whether the initialization strap is in place. If it is, the system jumps ahead as described hereinafter. If the initialization strap is not in, the system is instructed to clear all individual active days, start times, run times and the like and then to check to see if the advance minutes system has been set. This is the same place in the loop where the fail-safe test and the initialization strap test have jumped if the conditions are detected.

If the Advance Minute signal is activated, the system then checks to see if the ½ second duration is up. If not, the system reverts to the initialization loop shown in FIG. 4A. If the ½ second is up, the system is instructed to increment the minutes and reset on 60 and then to proceed to display the temporary time and then return to the initialization loop.

If the Advance Minutes signal was not activated, the system determines whether the Advance Hour signal is activated. If it is, the system is instructed to make the same test of the expiration of the ½ second. If not, the system returns to the initialization loop. If the ½ second has expired, the system is instructed to increment the hours in the 12-hour or 24-hour mode and to reset at midnight, to display the temporary time and return to the initialization loop.

If the Advance Hours signal is not activated, the system is instructed to set the Save-Time-To-Real-Time counter and to return to the initialization loop if the enter signal has been supplied. If the Enter signal has not been supplied, the system is instructed to set the display to all zeros for a 24-hour operation or to 1200A for 12-hour operation if the clear signal has been supplied. In that case, the system is also instructed to display the temporary time and return to the initialization loop shown in FIG. 4A.

If the Clear signal is not sat, the start signal is examined. If it is supplied, the system returns to the display loop shown in FIG. 4B. If not, the system checks to see if the zero index signal is supplied. If it has been, the system is instructed to set the temporary time to real time and then to display the temporary time and return to the initialization loop. If the zero index signal is not applied, the system returns to the loop shown in FIG. 4D and sets the error mode flag, blinks the display and then returns to the initialization loop.

Referring now to FIG. 4I, the manual operation loop is shown. This is the operating loop which is selected when the Manual mode switch is operated as suggested in the loop in FIG. 4C.

When the Manual mode is initiated, the system is instructed to check the clear signal. If a Clear signal is supplied, the circuit returns to the display loop shown in FIG. 4B. If a Clear signal is not provided, the system next checks the Program Advance signal. If the Program Advance signal is supplied either from this loop or from the loop shown in FIG. 4F, the system is instructed to bump the index by one and then to see if the index equals the station plus one. If not, the system is instructed to display the station number and the run time and to then return to the initialization stage in FIG. 4A. On the other hand, if the index station is equal to the station plus one, the system is instructed to reset to station 1, display the station number and the run time and to then return to the initialization loop of FIG. 4A.

If the Program Advance signal is not provided, the start signal is checked. If the Start signal is supplied, the system is instructed to store the index for the run mode use and then to set the Manual Flag and return to the initialization loop shown in FIG. 4A.

If the Start signal is not provided, the system is instructed to check the advance minute signal. If this signal is provided, the system checks to see if the ½ second has elapsed. If it has not, the system returns to the initialization loop. If the ½ second has elapsed, the system is instructed to advance the list minutes (stored in internal memory) by one and to go to the subloop to determine if the list number equals the maximum plus one. If not, the system is instructed to set the one shot mode flag, display the station number and run time and then to return to the loop shown in FIG. 4A. If the maximum plus one signal is yes, the system is instructed to reset to the first step and then perform the set one shot mode flag operation described above.

If the Advance Minutes signal is not supplied, the advance hours signal is examined. If it is present, the system is instructed to see if a ½ second has elapsed. If not, the system returns to the initialization loop shown in FIG. 4A. If it has occurred, the system is instructed to advance the list hours by one and then to enter into and follow the maximum plus one test loop described relative to the minutes operation.

If the Advance Hours system is not present, the system is instructed to evaluate the zero index signal. If it is present, the system is instructed to display the station number and run time and then return to the initialization program in FIG. 4A. If the zero index signal is not provided, the system is instructed to set the error mode flag, blink the display and return to the initialization program.

Referring now to FIG. 4K, there is shown routines which are utilized when the system has indicated that an individual active day mode is in effect or if a Set Day signal has been provided in the absence of, inter alia, the individual active day mode.

The first mentioned mode of operation, the system first checks to see if the program advance signal has been activated. If it has, then the second mentioned routine is entered into. If the program advance signal has not been produced, the system checks to see if the day number equals zero. If it does, a jump to a start operation is performed as will be described hereinafter. If the day equals zero signal is not set or detected, the system determines whether an enter signal has been supplied or not. If the enter signal has been supplied, the system is instructed to set this individual day to active and turn on the active day indicator and to then return to the initialization routine shown in FIG. 4A.

If the Enter signal is not detected, the system checks to see if the Clear signal has been entered. If the Clear signal has been entered, the system is instructed to set this individual day to inactive, turn off the active day indicator and proceed to the initialization routine shown in FIG. 4A.

If the Clear signal is not presented, the system checks to see if the Set Station signal is provided. If this is the case then the system is instructed to clear the IAD or (Individual Active Day) mode flag, clear the day from the display and proceed to the initialization routine shown in FIG. 4A. If the Set Station signal is not provided, the system goes to the start routine to which the system would have jumped had the day equalled zero signal been detected as described above.

Figure 4L:
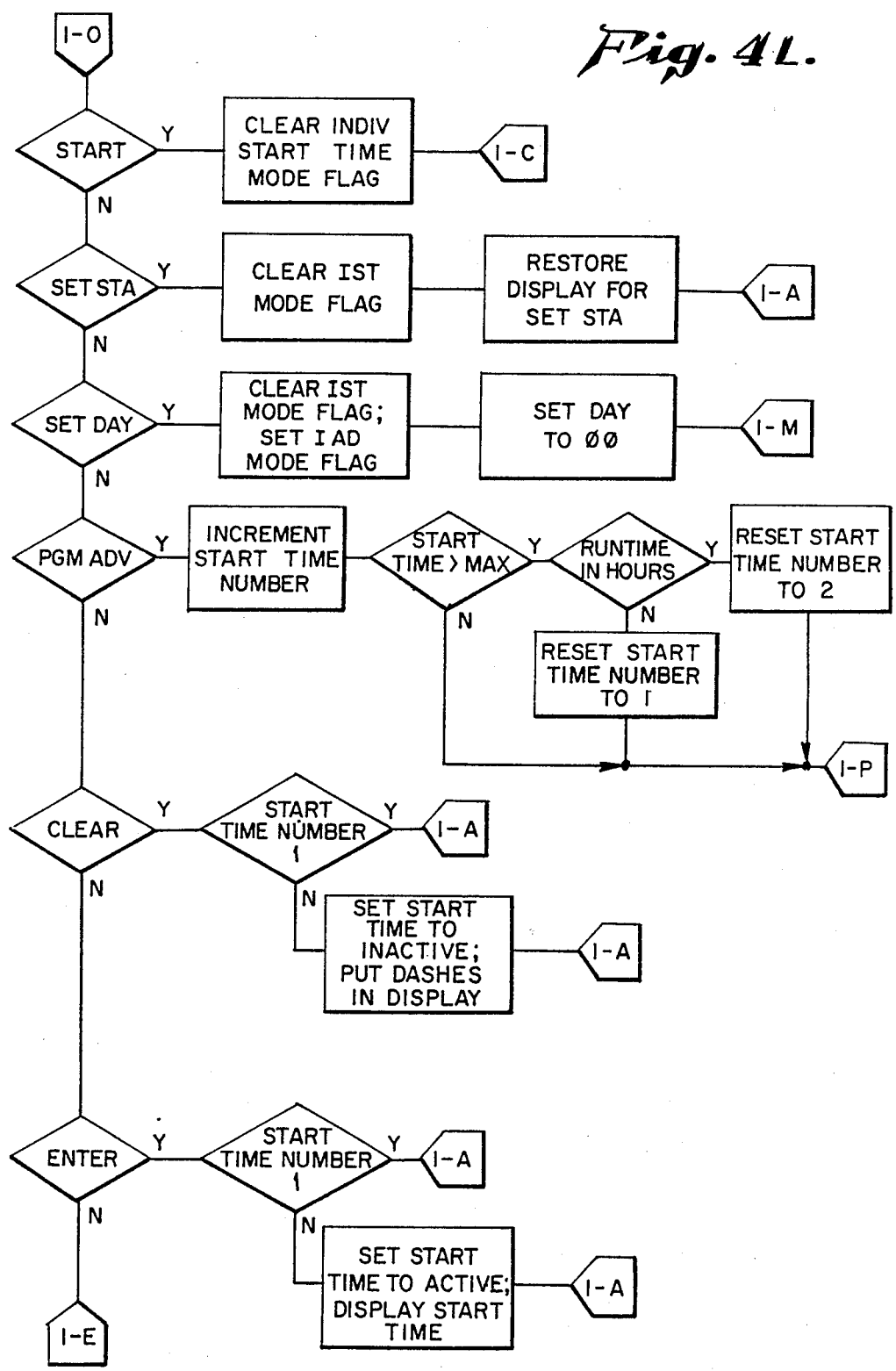

In this instance, the Start signal is interrogated. If the Start signal has been supplied, the system is instructed to clear the IAD mode flag and to proceed to the operation as shown and described in FIG. 4B. Conversley, if the start signal has not been detected, is the system checks to see if the Set Start Time signal has been selected. If it has, the system is instructed to clear the IAD day mode flag and to set the Individual Start Time (IST) mode flag and then begin the start routine as shown in FIG. 4L. If the Set Start Time signal is not detected, the system is instructed to set the error mode flag, blink the display and go to the initialization routine as shown in FIG. 4A and 4D.

As noted, the routine shown in FIG. 4K also is activated when a Set Day signal has been detected and the system has set the individual active day mode flag and set the day to zero. The system then detects whether the day number equals maximum signal has been detected. It should be noted that this test is controlled by an input from the strap options portions of the circuit which indicate whether a 12 or 14-day mode of operation is under way. If the day equals max signal is generated, the system is instructed to reset the day to zero and to detect if any days are active. If no days are active, the system is instructed to clear IAD day mode flag and proceed to the display routine shown in FIG. 4B.

Conversely, if a day not equal to maximum signal is detected, the system is instructed to proceed to increment the day and display and then to determine if an active day is involved. If the answer is no, the system is instructed to recycle to determine if the day equals maximum and so forth as described above. If on the other hand, the active day signal is detected, the system is instructed to determine whether this is an individually active day. If the answer is yes, the system is instructed to turn on the active day indicator and proceed to the initialization routine shown in FIG. 4A. Conversely, if the individual day active signal is negative, the system is instructed to turn off the active day indicator and then proceed to the initialization stage shown in FIG. 4A.

Referring now to FIG. 4L, the system is instructed to determine whether a Start signal has been supplied. If it has, the system is instructed to clear the individual start time mode flag and return to the display routine shown in FIG. 4B.

Conversely, if the Start signal is not provided, the system is instructed to determine if a Set Station signal has been supplied. If it has, the system is instructed to clear the IST mode flag and to restore the display for the set station and then to begin the initialization program cycle shown in FIG. 4A. Conversely, if the Set Station signal is not detected, the system is instructed to see if the Set Day signal has been supplied. If it has, the system clears the IST mode flag, sets the IAD mode flag, sets the day to zero and returns to the day maximum cycle described in FIG. 4K.

If the Set Day signal is not supplied, the system checks to see if the Program Advance signal has been supplied. If it has, the system is instructed to increment the start time number and then to determine if the start time is greater than the maximum permitted. If not, the system is instructed (see FIG. 4F) to display the station number and run time and return to the initialization cycle shown in FIG. 4A. If the start time is greater than the maximum, the system checks to see if the run time is in hours. If it is, the system is instructed to reset the start time number to 2. If the run time is not in hours, the system is instructed to reset the start time number to 1. In either case, after the reset start time operation has been carried out, the system is instructed to display the station number and run time and then to return to the initialization cycle.

In the event that the Program Advance signal was not displayed as noted above, the system checks to see if a Clear signal has been provided. If the Clear signal has been provided, the system is instructed to determine whether the start time number is 1. If it is, the system returns to the initialization cycle as before. If the start time number is not 1, the system is instructed to set the start time to inactive, put dashes in the display and then return to the initialization program.

If the Clear signal is not detected, the system determines whether an Enter signal has been provided at the keyboard. If it has not, the system is instructed to set the error mode flag, blink the display and return to the initialization program. If the enter signal is provided, the system determines whether the start time number is 1. If it is, the system returns to the initialization program. If the start time number is not 1, the system is instructed to set the start time to active, display time and then return to the initialization program.

Thus, there is shown and described a new and unique and much improved system for controlling irrigation systems and apparatus. The system shown and described is capable of a far more discrete and detinitive control of an irrigation apparatus. The control can be very finely defined in terms of numbers of starting times, number of stations controlled, and duration of irrigation times on any number of days. A large "matrix" of start times and operating times is achievable with this apparatus.

The description is directed to specific types of circuitry and control systems. It is clear that those skilled in the art will be able to produce or conceive modifications to the system and operation as shown and described. However, any such modifications which are provided by those skilled in the art and which fall within the purview of this description, are intended to be included therein as well. This description is intended to be illustrative only and is not intended to be limitative. Rather, the scope of the invention is limited by the claims appended hereto.

I claim:

1. An improved irrigation controller for individually and automatically controlling water flow to a plurality of individual watering stations in accordance with a programmed watering schedule over a period of days, said controller including a single mechanically-operated key for cancelling all scheduled watering if said key is activated twice while no watering is taking place, for cancelling just the watering scheduled to take place on a particular day, but not the watering scheduled to take place on any subsequent day, if said key is activated once on that particular day while no watering is taking place and, for cancelling just the watering taking place on a particular day, but not the watering scheduled to thereafter take place on that or any subsequent day, if said key is actuated once on that particular day while watering is taking place.

2. The improved irrigation controller of claim 1 further including a display for displaying a first visual indicia upon a single actuation of said key and for displaying a second visual indicia upon two actuations of said key, said first and second visual indications being different.

3. The improved irrigation controller of claim 2 wherein said first visual indication is a "C" and wherein said second visual indication is a "PC."

* * * * *